United States Patent

Junk et al.

[11] Patent Number: 4,680,843
[45] Date of Patent: Jul. 21, 1987

[54] APPARATUS FOR ROTATING THE SHELLS OF ROLLS IN CALENDERS OR THE LIKE

[75] Inventors: Dieter Junk, Kreuztal; Richard Rauf, Krefeld, both of Fed. Rep. of Germany

[73] Assignee: Kleinewefers GmbH, Krefeld, Fed. Rep. of Germany

[21] Appl. No.: 905,671

[22] Filed: Sep. 9, 1986

[30] Foreign Application Priority Data

Sep. 14, 1985 [DE] Fed. Rep. of Germany ....... 3532843

[51] Int. Cl.⁴ .................... B21B 13/02; B05C 1/08
[52] U.S. Cl. .................... 29/116 R; 29/112
[58] Field of Search .............. 29/110, 112, 116 R, 29/130; 100/155 R, 161, 172, 162 B, 163 R, 164, 168, 169; 241/252, 554, 215, 207

[56] References Cited

U.S. PATENT DOCUMENTS

| | | | |
|---|---|---|---|
| 3,075,632 | 1/1963 | Watt | 29/116 R |
| 3,419,890 | 12/1968 | Sustus | 29/116 R |
| 3,834,632 | 9/1974 | Docksteader | 241/286 |
| 4,402,233 | 9/1983 | Toivonen et al. | 29/116 R |
| 4,477,954 | 10/1984 | Molinatto | 29/116 R |
| 4,570,314 | 2/1986 | Holik et al. | 29/116 R |

Primary Examiner—Howard N. Goldberg
Assistant Examiner—Irene Graves Golabi
Attorney, Agent, or Firm—Peter K. Kontler

[57] ABSTRACT

The cylindrical shell of a roll in a calender is rotatable about and is movable radially of a stationary carrier. The shell receives torque from a gear which is rotatably journalled in a housing. The housing is movable radially of the shell by a motor operated in response to signals from a monitoring device which ascertains deviations of the position of the shell from a preselected position. Adjustments of the housing relative to the carrier are proportional to or match the extent of deviation of the position of the shell from the preselected position.

19 Claims, 6 Drawing Figures

APPARATUS FOR ROTATING THE SHELLS OF ROLLS IN CALENDERS OR THE LIKE

BACKGROUND OF THE INVENTION

The present invention relates to rolls for use in calenders and like machines.

Many types of calenders employ rolls wherein a cylindrical shell rotatably surrounds and is movable radially of an elongated carrier (for example, an elongated shaft) the end portions of which are mounted in spherical bearings of the machine frame. Reference may be had, for example, to German Offenlegungsschrift No. 31 01 115, German Pat. No. 25 07 677 and numerous U.S. patents of the assignee of the present application. A somewhat similar mounting for a carrier which is surrounded by the shell of a roll is disclosed in German Offenlegungsschrift No. 20 35 562.

In many instances, the shell must be free to perform (within limits) radial movements relative to its carrier. If the shell is to be positively driven (namely not merely in response to rotation of a companion roll or in response to reception of torque from a sheet which is being treated by the roll), the means for transmitting torque to one end portion of the shell normally comprises a driven gear which is rigidly connected to the shell and meshes with a driver gear rotatably mounted in a stationary component of the machine frame.

The aforementioned German Pat. No. 25 07 677 discloses a roll wherein the shell is movable relative to a row of hydrostatic supporting elements which are mounted on the carrier. The supporting elements are actuatable by a pressurized hydraulic fluid so as to change the curvature of the rotating shell and to thus alter the width of the nip of the external surface of the shell and the external surface or surfaces of one or more neighboring rolls. The driven gear of the means for rotating the shell is mounted in a housing pivotable about an axis which is located in a plane parallel to the plane of transverse movement of the shaft of the shell relative to its carrier. The driver gear is journalled in the frame of the machine and the driven gear is rigidly connected to one end portion of the shell.

The just described roll exhibits numerous advantages, especially if individual hydrostatic supporting elements or relatively small groups of neighboring hydrostatic supporting elements are actuatable independently of each other so as to alter the curvature of the corresponding portions of the rotating shell. At the very least, it is possible to accurately select the curvature of the shell in that plane which includes the axis of the shell and in which the axis of the shell is movable radially of the carrier. For example, such rolls can be used with advantage in calenders for the treatment of webs of paper, textile material, metallic or synthetic plastic foils and the like. Proper selection of the width of the nip or nips of the external surface of the shell and the external surface or surfaces of one or more neighboring rolls renders it possible to properly control the quality of the running web or sheet material. Similar advantages can be achieved if such rolls are used in sheet metal rolling mills, roller type transporting systems and the like. The means for actuating or operating the hydrostatic supporting elements receives signals from sensors which ensure that the configuration or curvature of the shell is changed practically instantaneously in response to detected deviation of actual curvature of the shell from a desired or optimum curvature.

It has been found that, in conventional machines, all of the above-enumerated advantages can be exhibited only by a roll whose shell is not positively driven. At the very least, the advantages are fewer and less pronounced if the shell of the roll is driven by a set of gears which are mounted in a conventional manner, for example, as disclosed in German Pat. No. 25 07 677. On the other hand, it is often desirable to positively drive the shell of a roll which is used in a calender or the like. The need for a positive drive will arise if the speed of the shell must deviate from that speed which can be imparted to the shell by a conveyor belt or by a running sheet or web of material which advances through the nip of the shell and an adjoining roll.

OBJECTS AND SUMMARY OF THE INVENTION

An object of the invention is to provide a roll which exhibits all advantages of heretofore known rolls having hydrostatic supporting elements for the rotary shell and whose shell can be positively driven by a set of gears or the like.

Another object of the invention is to provide a roll wherein the inclination and/or curvature of the shell can be regulated with a high degree of accuracy in spite of the fact that the shell is positively driven at one or both ends.

A further object of the invention is to provide a roll which exhibits the above-outlined advantages and can be installed in existing calenders and similar machines as a superior substitute for presently utilized rolls.

An additional object of the invention is to provide novel and improved means for transmitting torque to the shell of a roll wherein the shell is free to rotate about and is movable radially of its carrier.

Still another object of the invention is to provide a novel and improved motion transmitting unit between a stationary prime mover and the shell of the above outlined roll.

A further object of the invention is to provide the roll with novel and improved means for monitoring the radial position of its shell.

The invention resides in the provision of a combination of elements which can be utilized in a calender or in a similar machine and includes an elongated carrier, a cylindrical shell which spacedly surrounds and is movable radially of the carrier, and drive means for rotating the shell. The drive means includes a housing which is movable relative to the carrier in the radial direction of the shell, a driven rotary element (such as a gear) which is journalled in the housing and serves to transmit torque to the shell, signal generating means for monitoring the radial position of the shell, and means for adjusting the position of the housing relative to the carrier in response to signals from the monitoring means.

The monitoring means can include means for generating signals which denote deviations of the position of the shell from a predetermined position. The adjusting means of the drive means for the shell can comprise a stationary support (such as a bracket which is affixed to the frame of the machine), an adjustable motor which is interposed between the support and the housing, and means for operating the motor so as to change the position of the housing in response to signals from the monitoring means in a sense to move the housing through distances which are proportional to or match the deviations of the position of the shell from its predetermined position.

The combination of the present invention can further comprise means for confining the housing to movements substantially radially of the shell, and means for driving the rotary element. Such driving means can include a second rotary element which is journalled in the housing and can receive torque from a stationary prime mover through the medium of a cardan shaft or the like. The confining means can comprise two straight parallel guides which flank the carrier.

The support for the motor of the adjusting means can be mounted on a bearing for one end portion of the carrier. The motor of the adjusting means can comprise a fluid-operated motor or an electric linear motor. The electric or fluid-operated motor can be replaced with a motor-driven feed screw which serves to move the housing for the rotary element relative to the frame of the machine.

The monitoring means can include detector means for ascertaining the position of the shell relative to the housing. Alternatively, or in addition to such detector means, the monitoring means can comprise a detector which serves to ascertain the position of the shell relative to the carrier. In the latter instance, the housing is preferably adjacent one end portion of the carrier and the monitoring means can comprise a sensor which is connected to the carrier and a sensor-actuating member which is provided on the shell. The actuating member can be mounted at one end of the shell and can include or can constitute a part which is rotatably mounted on the shell so that the shell can rotate relative to the actuating member.

In each embodiment of the invention, the monitoring means can comprise one or more distance measuring devices, one or more optical sensors or one or more mechanically actuatable valves. Still further, the monitoring means can include one or more sensors which are interposed between the housing and the shell.

It is also possible to employ monitoring means having one or more sensors which are installed in the adjusting means, for example, between the aforementioned motor and the support or between the feed screw and the support.

The improved combination can further comprise torque transmitting means which is interposed between the rotary element and the shell and serves to permit radial movements of the shell and the housing relative to each other. The torque transmitting means can include a toothed clutch, for example, a clutch which is similar to that disclosed in U.S. Pat. No. 4,352,228 granted to Iso-Aho.

The novel features which are considered as characteristic of the invention are set forth in particular in the appended claims. The improved combination itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
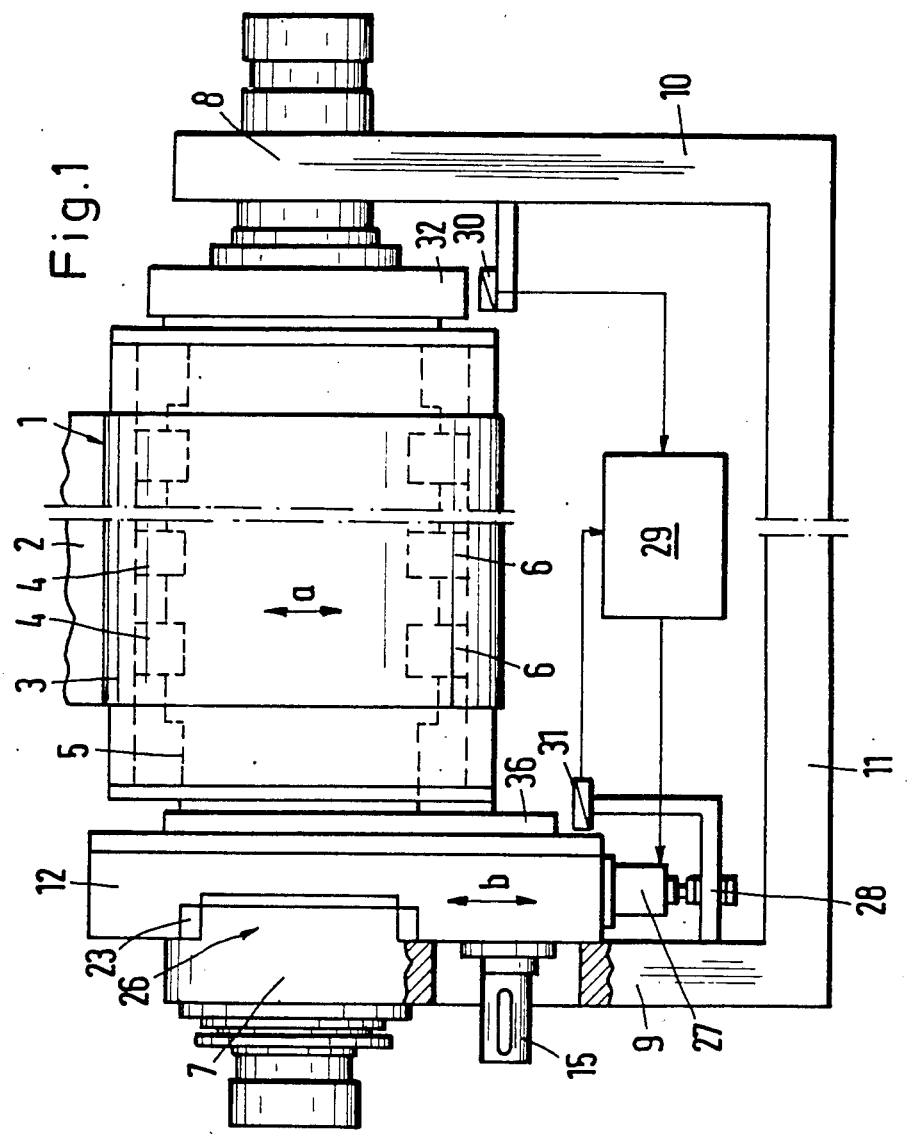
FIG. 1 is a schematic partly elevational and partly sectional view of a machine employing a roll with a shell which is rotated by drive means embodying one form of the present invention.
Figure 2:
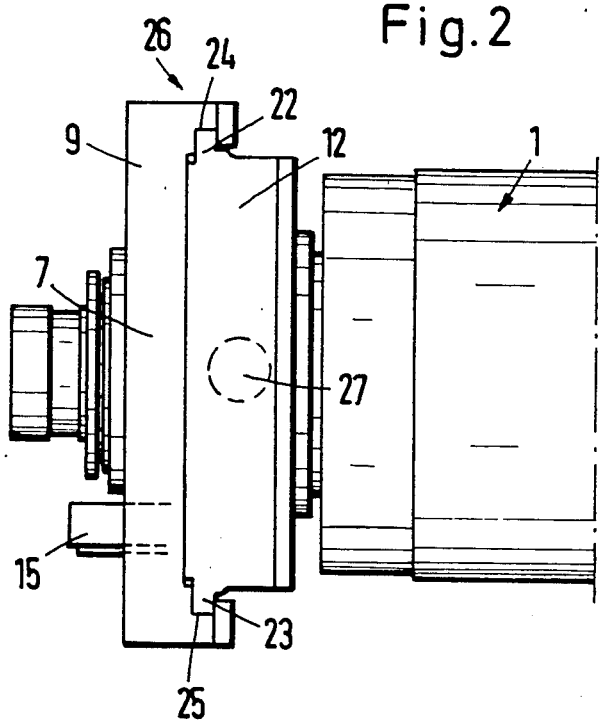
FIG. 2 is a fragmentary schematic plan view of the left-hand portion of the structure which is shown in FIG. 1.
Figure 3:
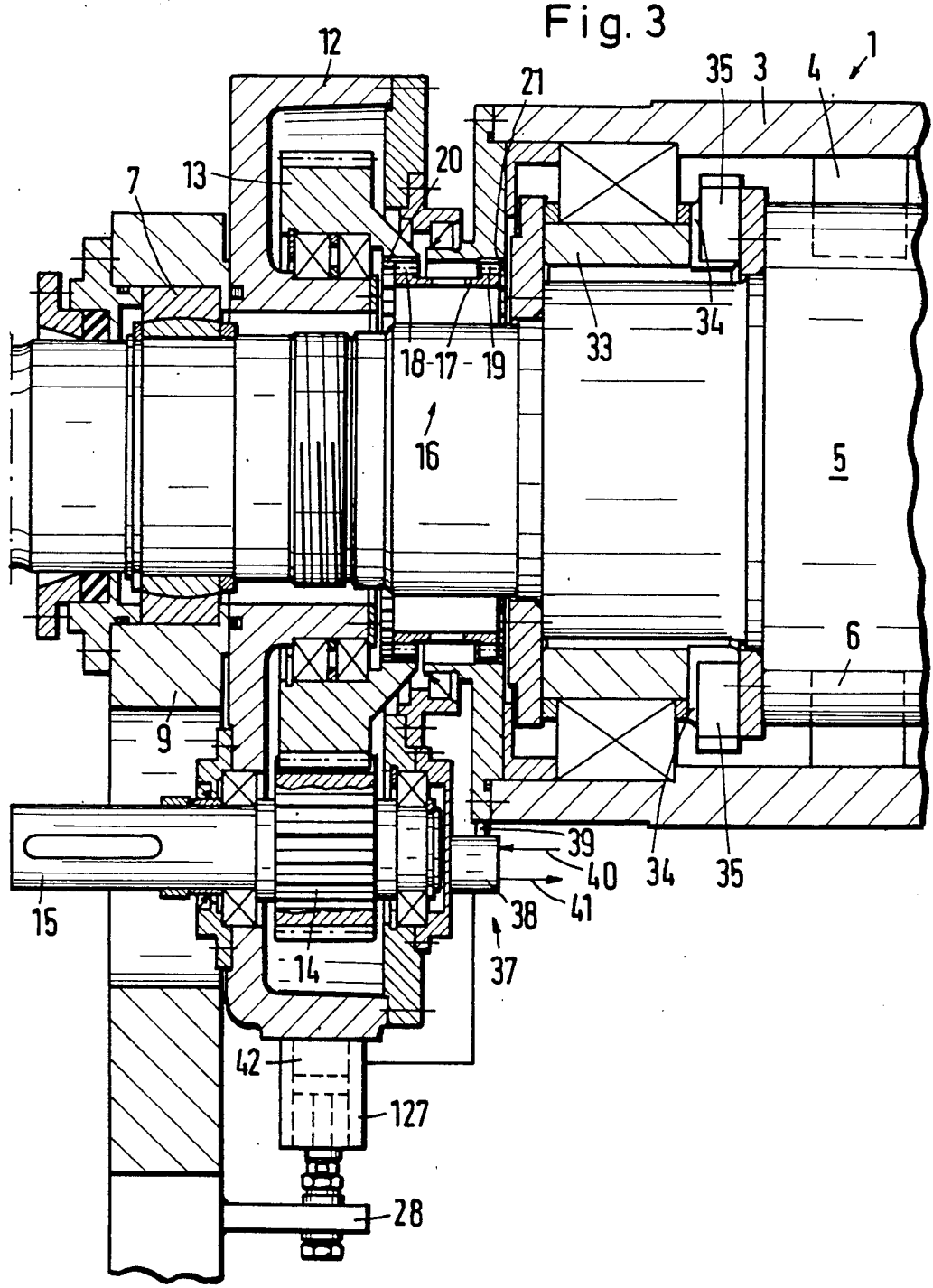
FIG. 3 is an enlarged axial sectional view of slightly modified drive means.

The structure which is shown in FIGS. 1 and 2 is practically identical with that of FIG. 3 except that the structure of FIG. 3 employs a modified monitoring device.

FIGS. 1 and 2 show a first roll 1 which cooperates with a second roll 2 and comprise a cylindrical shell 3 and an elongated carrier 5 the end portions of which are mounted in spherical bearings 7. The shell 3 surrounds and is movable radially of the carrier 5 in a substantially vertical plane. The nip of the rolls 1 and 2 can be used to treat a running web of paper, textile, synthetic plastic material or metal.

The curvature of the 3 shell can be regulated by a row of hydrostatic supporting elements 4 which are mounted on the carrier 5 and are adjacent the topmost portion of the internal surface of the shell. In order to stabilize the position of the shell 3, the machine which embodies the rolls 1 and 2 can be provided with a second row of hydrostatic supporting elements 6 which are disposed between the lower portion of the carrier 5 and the adjacent portion of the internal surface of the shell. The directions in which the supporting elements 4 and/or 6 can adjust the adjacent portions of the shell are indicated by a double-headed arrow a. Each supporting element 4 and/or 6 can comprise a battery of two or more neighboring discrete hydrostatic supporting elements which are adjacent to each other in the circumferential direction of the carrier 5. Reference may be had to U.S. Pat. No. 4,394,793. The manner in which the hydrostatic supporting elements 4 and 6 receive pressurized fluid from a suitable control system, either individually or in groups of two or more, in order to alter the shape of adjacent portions of the shell 3 is well known and need not be described here.

FIG. 3 shows one of the spherical bearings 7 for the carrier 5. The other spherical bearing is mounted in the topmost portion 8 of an upright frame member 10 which is shown in FIG. 1. The frame of the machine further comprises a second upright frame member 9 and a horizontal base or bed 11 between the lower portions of the frame members 9, 10.

The drive means for the shell 3 comprises a rotary element 13 in the form of a large-diameter gear 13 which is journalled in a bearing 12 (hereinafter called housing to distinguish from the bearings 7 for the end portions of the carrier 5). The gear 13 is driven by a second rotary element in the form of a pinion 14 which is rotatably journalled in the lower portion of the housing 12. The shaft 15 of the pinion 14 extends from the housing 12 and is connected to the output element of a stationary prime mover (not shown), for example in a manner as shown in FIG. 2 of German Pat. No. 25 07 677.

The drive means for the shell 3 further comprises a specially designed toothed clutch 16 which serves to transmit torque from the gear 13 to the adjacent end portion of the shell 3 in such a way that the shell is movable radially of the housing 12 and vice versa. The clutch 16 comprises a cylindrical clutch element 17 having two sets of external teeth. The external teeth 18 of the clutch element 17 mate with the teeth of an internal gear 20 of the gear 13, and the external teeth 19 of the clutch element 17 mate with internal teeth 21 provided in a washer-like end wall of the shell 3. As can be seen in FIG. 3, the clutch 16 allows the shell 3 and the housing 12 to perform limited radial movements relative to each other and the clutch 16 further permits a certain amount of mutual inclination of the housing and shell 3 relative to each other without generating a flexural moment.

The structure of FIGS. 1 and 2 further comprises a device 26 which serves to confine the housing 12 to movements in the radial direction of the shell 3. The confining device comprises two elongated vertical strip-shaped guide members 22 and 23 which flank the respective end portion of the carrier 5 and are received in complementary vertical grooves 24, 25 provided in the upright frame member 9. The guide members 22, 23 are disposed at opposite sides of the spherical bearing 7 for the respective end portion of the carrier 5.

The drive means for the shell 3 still further comprises means for automatically adjusting the position of the housing 12 relative to the carrier 5 (by moving the guide members 23, 24 or the housing 12 relative to the surfaces bounding the grooves 24 and 25) in response to shifting of the shell 3 from a predetermined position with reference to the carrier 5. The means for adjusting the position of the housing 12 comprises a stationary support 28 which is a bracket secured to or forming part of the upright frame member 9, a motor 27 which operates between the support 28 and the housing 12 and can move the housing in directions indicated by a double-headed arrow b, and a control unit or operating unit 29 which controls the operation of the motor 27 and receives signals from at least one monitoring device serving to ascertain the radial position of the shell 3. The motor 27 which is shown in FIG. 1 is a commercially available electric linear motor which can move the housing 12 up and down. The means for monitoring the position of the shell 3 comprises an inductively operated sensor 30 which is mounted on a platform of the frame member 10 adjacent a vertically movable actuating element 32 in the form of a ring which is rotatable relative to the shell 3 but is compelled to share all radial movements of the shell with reference to the carrier 5. The sensor 30 determines the distance between its upper side and the adjacent portion of the actuating element 32 and transmits appropriate signals to the corresponding input of the operating unit 29. The actuating element 32 is mounted on a cylindrical component which is analogous to the component 33 shown in FIG. 3. The component 33 is rotatable in the shell 3 but is compelled to share all radial movements of the shell. The means for holding the cylindrical component 33 against rotation relative to the carrier 5 comprises one or more grooves 34 at one axial end of the component 33 and one or more projections 35 in the form of teeth provided on the carrier 5 and extending into the adjacent groove or grooves 34.

The monitoring means of the structure which is shown in FIGS. 1 and 2 further comprises a second sensor 31 which is mounted on the support 28 and cooperates with an actuating element 36 provided on the housing 12. The sensor 31 transmits to the corresponding input of the operating unit 29 signals denoting the distance between the support 28 and the housing 12.

The mode of operation of the operating unit 29 is such that the distance between the housing 12 and the support 28 is altered in proportion to or in exact accordance with changes of the distance of the actual position of the shell 3 from the ideal or desired radial position of the shell. The provision of the sensor 31 and actuating element 36 is desirable and advantageous because such parts of the monitoring means ensure that the weight of the housing 12 and of the parts which are mounted thereon cannot influence the position of the shell 3.

The just described mode of operation of the adjusting means 27-29 for the housing 12 ensures that the weight of the housing 12 cannot pull the respective end portion of the shell 3 in a downward direction. The motor 27 can partially or completely eliminate the influence of the weight of the housing 12, and of the parts which are mounted therein or thereon, upon the respective end portion of the shell 3. Consequently, any changes of pressure in the hydrostatic supporting elements 4 and/or 6 which are adjacent the housing 12 influence the position or shape of the corresponding portions of the shell 3 to the same extent as in the region of the actuating element 32. This renders it possible to ensure a highly predictable selection of the curvature of the shell 3. In other words, each change of pressure of the fluid which is admitted into the cylinder chambers of the hydrostatic supporting elements 4 and 6 can alter the inclination or curvature of the adjacent portion of the shell 3 in a highly predictable manner. This ensures an adjustment of the width of the nip of the rolls 1 and 2 with a degree of precision considerably exceeding that which is achievable in conventional calenders and like machines.

The provision of confining means 26 for the housing 12 is desirable and advantageous because the housing is compelled to perform movements (in response to actuation of the motor 27) in directions (see the double-headed arrow b) which are parallel to the directions of adjustment of selected portions of the shell 3 by the hydrostatic supporting elements 4 and/or 6 (see the double-headed arrow a). Such confinement of the housing 12 to vertical reciprocatory movements is in contrast to earlier proposals which disclose means for pivotally mounting the housing for the element which drives the shell. The fact that the pinion 14 is also journalled in the housing 12 does not affect the accuracy of adjustment of the shell 3 because the entire housing 12 is carried by the motor 27 which can accurately select the vertical position of the housing regardless of the weight of the housing and of the parts which are mounted therein.

Another important advantage of the confining means 26 is that the width of the roll 1 is reduced and that the space requirements of the roll, as considered at right angles to the plane of FIG. 1, are smaller than those of a roll wherein the housing is mounted for pivotal movement about a horizontal axis. The space requirements of the confining means 26 are especially small if the guide members 22 and 23 flank the spherical bearing 7 for the corresponding end portion of the carrier 5.

The support 28 could be mounted on the base 11 or on the bearing 7, i.e. on any part or parts which do not share the movements of the housing 12 and/or shell 3.

The sensor 30 of the monitoring means for the vertical position of the shell 3 need not necessarily be mounted on the frame member 10. However, such mounting has been found to be practical and desirable because the sensor 30 is readily accessible. It is further possible to mount the sensor 30 on the housing 12 so that the signals from the sensor to the control unit 29 will indicate changes in the position of the shell relative to the housing. Such mode of mounting the sensor 30 would further simplify the construction of means for adjusting the housing 12.

The monitoring means 37 of the structure which is shown in FIG. 3 comprises a sensor in the form of a valve 38 having a movable portion 39 which can be acted upon by the left-end wall of the shell 3. The motor 127 of adjusting means for the housing 12 of FIG. 3 is a fluid-operated (preferably hydraulic) motor which is mounted on the support 28 and can move the housing up and down. In the embodiment of FIG. 3, the cylinder of the motor 127 is secured to the housing 12 and the piston rod of the motor 127 is affixed to the support 28. The valve 38 can be actuated to admit into the cylinder chamber 42 of the motor 127 a pressurized fluid from a suitable source by way of a first conduit 40 or to permit evacuation of fluid from the cylinder chamber 42 by way of a second conduit 41. The body of the valve 38 is mounted on the housing 12.

When the movable portion 39 of the valve 38 is held in a neutral position (corresponding to the predetermined or preselected vertical position of the shell 3), the valve 38 seals the conduits 40 and 41 from the cylinder chamber 42 in the motor 127. In other words, a supply of fluid is entrapped in the cylinder chamber 42. When the left-hand end portion of the shell 3 which is shown in FIG. 3 rises, the movable portion 39 of the valve 38 moves upwardly under the action of a suitable spring (not shown) so that the conduit 40 can admit pressurized fluid from a compressor into the cylinder chamber 42. This causes the housing 12 to rise so that it follows the upward movement of the shell 3. Inversely, if the left-hand end portion of the shell 3 descends, the movable portion 39 of the valve 38 is depressed below its neutral position and enables the conduit 41 to allow a certain quantity of fluid to flow from the cylinder chamber 42 so that the housing 12 moves downwardly, preferably at a rate which is proportional to or matches the rate of downward movement of the shell 3. In other words, the level of the housing 12 relative to the shell 3 remains unchanged or substantially unchanged regardless of the extent and/or direction of movements of the respective end portion of the shell.

Figure 4:
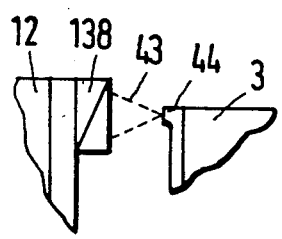
FIG. 4 is a fragmentary schematic elevational view of a combination wherein the position of the shell is monitored by an optical sensor.

FIG. 4 shows a portion of a modified machine wherein the adjusting means for the housing 12 receives signals from a monitoring device including an optical sensor 138 on the housing. The sensor 138 emits a beam 43 of radiation which impinges upon a reflecting surface 44 at the respective end of the shell 3. If the shell 3 is moved up or down, the beam 43 impinges upon the surface 44 to a different extent whereby the sensor 138 transmits an appropriate signal to the operating unit 29 (not shown in FIG. 4) which adjusts the level of the housing 12 accordingly. The arrangement is preferably such that the extent of reflection of the beam 43 is reduced to zero if the shell 3 rises above its neutral position, and that the extent of reflection is reduced to less than average if the shell descends. Such changes in the intensity of reflected radiation are processed by the operating unit 29 and are used to actuate the corresponding motor 27 or 127 accordingly.

Figure 5:
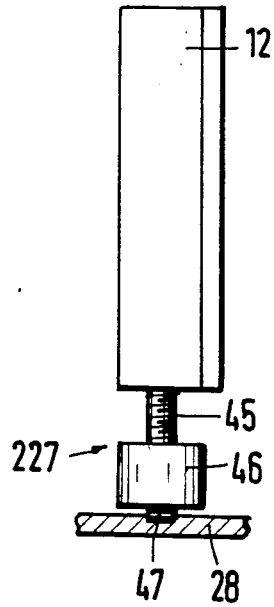
FIG. 5 is a fragmentary elevational view of a portion of a further combination wherein the housing for the rotary element which drives the shell is movable radially by a motor-driven feed screw.

FIG. 5 shows a portion of a modified machine wherein the housing 12 is movable up and down by a feed screw 45 which forms part of an adjusting unit 227 further including a reversible electric motor 46 which can rotate the feed screw in a clockwise or in a counterclockwise direction to thereby raise or lower the housing 12.

A monitoring device including a sensor 47 is mounted between the stationary support 28 and the casing of the motor 46 for the feed screw 45. The sensor 47 is responsive to pressure which is applied by the motor 46. The magnitude of the force which is applied to the sensor 47 should correspond to the weight of the housing 12 and of the parts which are carried thereby as well as of the feed screw 45 and motor 46. If such is not the case, the unit 227 is actuated in response to appropriate signals from the sensor 47 to cause the motor 46 to rotate the feed screw 45 in a clockwise or in a counterclockwise direction. Pressure-responsive sensors which can generate signals of variable magnitude or intensity are well known in the art. When the sensor 47 is acted upon by a pressure which corresponds to the weight of the housing 12, of the parts mounted in the housing, of the feed screw 45 and of the motor 46, the weight of the housing 12 does not act upon the respective end portion of the shell 3 (not shown in FIG. 5).

Figure 6:
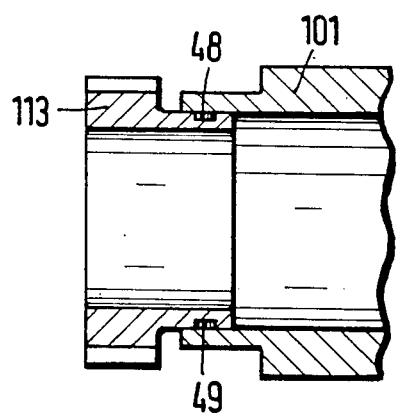
FIG. 6 is a fragmentary axial sectional view of a shell and of two sensors which are installed between an end portion of the shell and the rotary element which drives the shell.

FIG. 6 shows that two sensors 48, 49 of the monitoring means are installed between a sleeve-like extension at the left-hand axial end of the shell of the roll 101 and a sleeve at the right-hand axial end of the gear 113. The sleeves of the roll 101 and gear 113 are telescoped into each other and can be provided with mating gears to ensure the transfer of torque from the gear to the shell. The sensors 48 and 49 ascertain whether the gear 113 transmits to the shell and upwardly or a downwardly oriented force. If the magnitudes of the two forces are the same, the signals from the sensors 48, 49 do not cause any vertical adjustment of the housing (not shown) for the gear 113.

It is clear that the structures which are shown in the drawings can be modified in a number of additional ways without departing from the spirit of the invention. For example, the monitoring means can comprise one or more potentiometers or other types of sensors which can ascertain deviations of the position of the shell from its normal or neutral position. In addition, the adjusting means (such as that including the parts 27-29 shown in FIG. 1) can be replaced by other types of adjusting means. For example, the adjusting means can comprise a motor in the form of a heatable wax cartridge. The cartridge alters its length in response to heating or cooling to thereby alter the level of the housing 12.

The clutch 16 of FIG. 3 also constitutes an optional feature of the invention. However, this clutch or a similar clutch is desirable and advantageous because it allows the shell 3 to move relative to the housing 12. An additional advantage of the clutch 16 is that it renders it possible to operate with less accurate adjusting means for the level of the housing 12. This is due to the fact that the shell 3 has a certain freedom of vertical movement relative to the housing 12 and vice versa as well as that the mutual inclination of the shell 3 and housing 12 can be changed within certain limits. Such types of clutches are proposed to be used when the roll is called upon to transmit or to take up very pronounced stresses.

The following units could be used:

Control unit 29: Gould inc., Modicon Div., Andover Mass., US

Sensors 30, 31: Megatron KG, 8011 Putzbrunn, DE

Sensors 47, 48, 49: Elmess Hähne KG, 4000 Düsseldorf, DE

Valve 38: Mannesmann Rexroth GmbH, 8770 Lohr am Main, DE

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a roll assembly the combination of an elongated carrier; a cylindrical shell spacedly surrounding and movable radially of said carrier; and drive means for rotating said shell, including a housing which is movable relative to said carrier in a substantially radial direction of said shell, a driven rotary element journalled in said housing and arranged to transmit torque to said shell, signal generating means for monitoring the radial position of said shell, and means for adjusting the position of said housing relative to said carrier in response to signals from said monitoring means.

2. The combination of claim 1, wherein said monitoring means includes means for generating signals which denote deviations of the position of said shell and/or of said housing from a predetermined position, said adjusting means comprising a stationary support, an adjustable motor interposed between said support and said housing, and means for operating said motor so as to change the position of said housing in response to said signals in a sense to move the housing through distances which are proportional to or match deviations of the position of said shell and/or said housing from said predetermined position.

3. The combination of claim 1, further comprising means for confining said housing to movements substantially radially of said shell, and means for driving said rotary element including a second rotary element which is journalled in said housing.

4. The combination of claim 3, wherein said confining means comprises two straight parallel guides flanking said carrier 5. The combination of claim 4, wherein further comprising a bearing for said carrier, said adjusting means comprising a support on said bearing, an adjustable motor interposed between said support and said housing, and means for operating said motor in response to signals from said monitoring means.

6. The combination of claim 1, wherein said adjusting means comprises a fluid-operated motor for moving said housing.

7. The combination of claim 1, wherein said adjusting means comprises an electric linear motor for moving said housing.

8. The combination of claim 1, wherein said adjusting means comprises a motor-driven feed screw for moving said housing.

9. The combination of claim 1, wherein said monitoring means includes means for monitoring the position of said shell relative to said housing.

10. The combination of claim 1, wherein said monitoring means includes means for monitoring the position of said shell relative to said carrier.

11. The combination of claim 10, wherein said carrier has first and second end portions and said housing is adjacent one of said end portions, said monitoring means comprising a sensor which is connected to said carrier and a sensor-actuating member provided on said shell.

12. The combination of claim 11, wherein said shell has an end portion which is adjacent the other end portion of said carrier and said actuating member is rotatably mounted on said end portion of said shell.

13. The combination of claim 1, wherein said monitoring means comprises a distance measuring device.

14. The combination of claim 1, wherein said monitoring means includes an optical sensor.

15. The combination of claim 1, wherein said monitoring means includes a mechanically actuatable valve.

16. The combination of claim 1, wherein said monitoring means includes at least one sensor which is interposed between said housing and said shell.

17. The combination of claim 1, wherein said monitoring means includes a sensor which is installed in said adjusting means.

18. The combination of claim 1, further comprising torque transmitting means interposed between said rotary element and said shell and arranged to permit radial movements of said shell and said housing relative to each other.

19. The combination of claim 18, wherein said torque transmitting means includes a toothed clutch.

* * * * *